United States Patent [19]
Miura

[11] Patent Number: 5,777,716
[45] Date of Patent: Jul. 7, 1998

[54] PROGRESSIVE POWER PRESBYOPIA-CORRECTING OPHTHALMIC LENSES

[75] Inventor: Hitoshi Miura, Okazaki, Japan

[73] Assignee: Tokai Kogaku Kabushiki Kaisha, Japan

[21] Appl. No.: 518,026

[22] Filed: Aug. 22, 1995

[30] Foreign Application Priority Data

Aug. 26, 1994 [JP] Japan .................. 6-202539

[51] Int. Cl.⁶ ............................ G02C 7/06
[52] U.S. Cl. ............................ 351/169
[58] Field of Search .................. 351/169, 168, 351/170, 171, 172

[56] References Cited

U.S. PATENT DOCUMENTS

| | | |
|---|---|---|
| 3,785,724 | 1/1974 | Cretin-Maitenaz ............. 351/169 |
| 4,315,673 | 2/1982 | Guilino et al. ............... 351/169 |
| 4,537,479 | 8/1985 | Shinohara et al. ............ 351/169 |
| 4,762,408 | 8/1988 | Shinohara ................... 351/169 |
| 4,952,047 | 8/1990 | Barth et al. ................ 351/169 |
| 5,123,725 | 6/1992 | Winthrop .................... 351/169 |

*Primary Examiner*—Georgia Y. Epps
*Assistant Examiner*—Jordan M. Schwartz
*Attorney, Agent, or Firm*—Nawrocki, Rooney & Sivertson, P.A.

[57] ABSTRACT

An ophthalmic lens includes a refractive surface partitioned into a first area, a second area located above the first area and a third area located below the first area. The first area includes a reading point providing a first refractive focal power on a meridional line. The second area provides a surface refractive focal power less than that of the reading point, and the third area provides a surface refractive focal power stronger than that of the reading point. The refractive focal power in the first area progressively changes between the second and third areas. The first area includes a quasi-clear vision area that has a maximum horizontal width in the proximity of the geometrical center of the lens and a clear vision area.

25 Claims, 10 Drawing Sheets

Fig.1A
(Prior Art)
Fig.1B
(Prior Art)
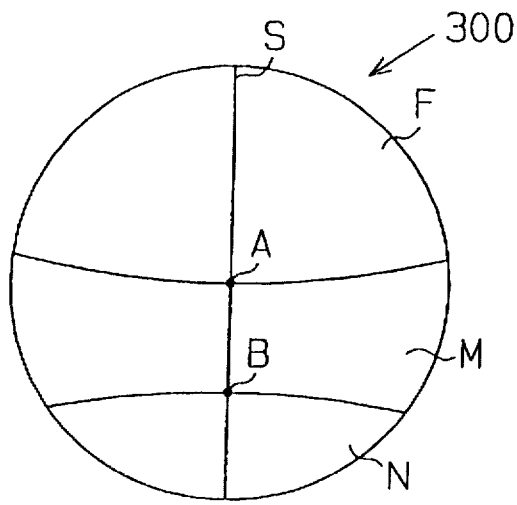
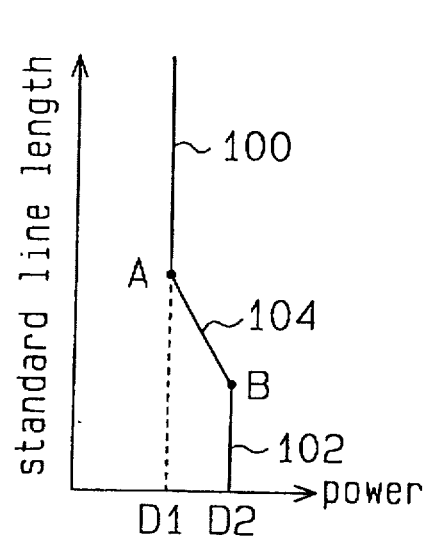
Fig.2 (Prior Art)
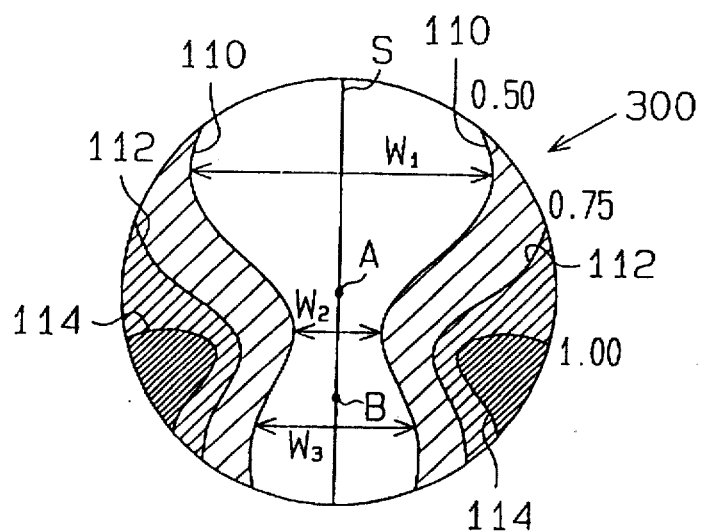

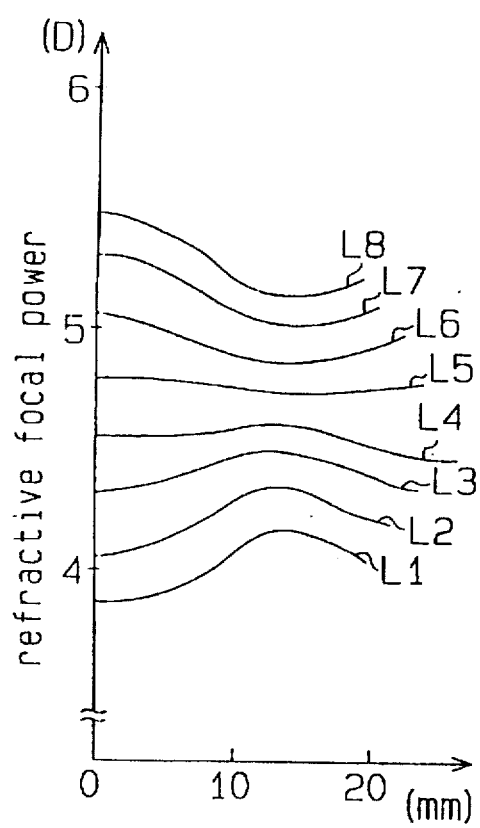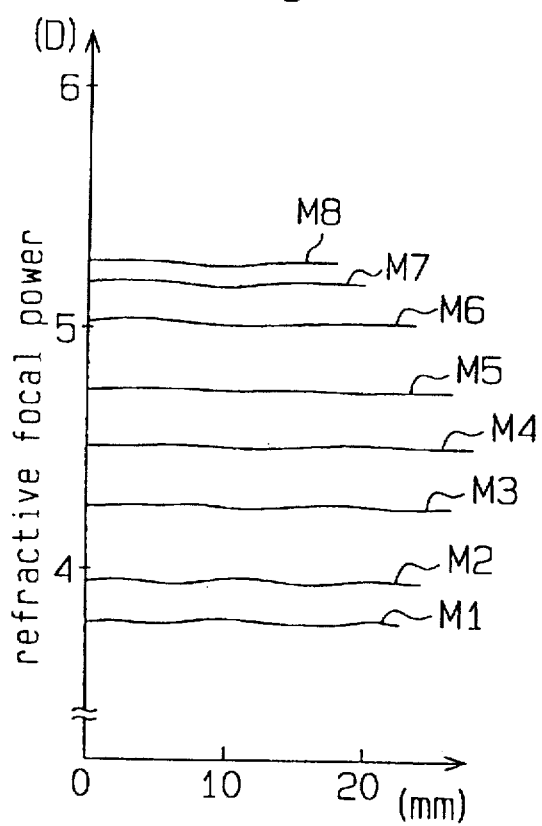

PROGRESSIVE POWER PRESBYOPIA-CORRECTING OPHTHALMIC LENSES

BACKGROUND OF THE INVENTION

1. Field of the Invention

The present invention relates generally to presbyopia-correcting ophthalmic lenses having progressive power. Particularly, the present invention relates to presbyopia-correcting ophthalmic lenses which increase the focused vision of wearers when viewing nearby objects.

2. Description of the Related Art

Towards a person's middle age (in the forties and thereafter), the ability of human eye to maintain proper focal length adjustment decreases due to decreasing resilience of the eye's lenses. The ability of the eye to adjust itself to objects at various distances is known as accommodation. As a person ages, his power of accommodation generally decreases. Conventional monofocal lenses (convex lenses) compensate for such loss to enable viewing of nearby objects. In other words, the monofocal lenses focus upon a certain nearby object even if the wearer does not have sufficient power of accommodation. Since monofocal lenses have a relatively low degree of aberration (particularly with respect to astigmatism), they can provide clear vision for the entire refractive surfaces area of the lens. The monofocal lens generally has a spherical refractive surface, but does not have a non-rotational symmetric prism. This allows the wearer to view objects with no unnatural reeling. However, since the monofocal lenses generally do contain distortions, when the wearer views an object through certain portions of the lens, the object looks distorted. Such distortions are present not only in presbyopia-correcting monofocal lenses but also in myopia or hyperopia-correcting monofocal lenses. Often, the wearers do not recognize such distortions by virtue of the consistent distortion of lens across its entire surface area. Consequently, lens wearers often have clear vision across the entire lens.

The monofocal lens has a fixed focal length. For example, if a wearer uses lenses having a focal length of 50 cm, the wearer could view objects locating at the distance of 50 cm from his eyes without exercising his power of accommodation. Should the wearer attempts to see objects locating nearer or farther than 50 cm using these lenses, the wearer would have to exercise some degree of accommodation. For example, when the wearer tries to see a nearby object locating at the distance of 25 cm using lenses having a focal length of 50 cm, it is necessary for the user to exercise a 2 D (diopter) power of accommodation. The user's lenses in this example are said to have a refractive power index of 2 D(1/0.5 m). Should the wearer not use the lenses in this example, the wearer would need to exercise a 4 D power of accommodation in order to view the object clearly. When the wearer of the lenses exercises a 2 D power of accommodation, he can see objects located at a distance of 25 cm. If the wearer does not adequately use their power of accommodation, the user must move their head in order to focus on the objects located at that distance.

It is generally accepted that middle aged people retain some power of accommodation and thus can see objects locating at different distances. One interesting example of this occurs with vertically written Japanese text. When this type of Japanese is read, the distance from the eyes to the letters vary between the upper portions of the lines and the lower portions of the lines, sometimes by as much as about 10 cm. Those who can exercise some degree of accommodation can easily focus over the entire portion of the text. Extended use of this power, however, is fatiguing and often causes the wearer to complain of asthenopia. Thus, the monofocal lenses which are designed for one type of viewing, i.e., near or far vision viewing, present serious inconveniences to people needing progressively powered lenses. Particularly, the monofocal lenses are not suited for looking over the entire surface of a newspaper or a desk top. Some monofocal lenses are designed to have a focal power that allows focused viewing of objects located over a fixed distance range of from 30 cm to 50 cm. However, people who have substantially no power of accommodation require lenses that allow viewing of objects over a fixed distance range of 30 cm or 40 cm.

Often times, when a person with substantially no power of accommodation uses monofocal lenses, focused vision occurs only in a shape of ellipse extending in the horizontal direction. The reason for this is that the distance between the eyes and an object to be observed changes greatly when the eye scans the lines of sight vertically. This change in distance is small when the lines of sight are scan horizontally. Consequently, focus vision occurs in the shape of an ellipse having a short vertical axis and a long horizontal axis. This shape is not only inconvenient for reading or writing in the vertical direction but also forces the wearer to move his head toward or away from the object, rather than to the right or left. The former type of head movement is much more awkward and unnatural than the latter.

Introduction of the progressive power lens has done much to overcome these difficulties. A conventional progressive power multifocal lens has a convex surface and a concave surface. The convex surface is formed to have an aspherical shape and is provided with a plurality of (two or three) viewing zones, each of which has a different surface refractive focal powers. With bifocal lenses the convex surface at the lens has two portions. The first portion is used to focus on nearby objects, and the second portion is used to focus on distant objects. With trifocal lenses, the third portion is located between the first and second portions and is used to focus on intermediate objects. The refractive focal power of the third portion varies progressively. The concave surface is formed to have a spherical or toric shape and is used to correct abnormal vision such as myopia, hyperopia, astigmatism, etc.

FIG. 1A shows a typical prior art progressive power multifocal lens. The convex surface of the lens 300 is demarcated into three viewing zones. The first zone, which is referred to as a distance portion F, is located at the top of the lens 300. The distance portion F has a surface refractive focal power allowing for focused vision on distant objects (e.g., objects located beyond 1 or 2 meters). The second zone, which is referred to as a reading portion N, is located at the bottom of the lens 300. The reading portion N has a surface refractive focal power allowing for focused vision on objects located within approximately 50 cm. The third zone, referred to as an intermediate portion M, is located between the distance portion F and the reading portion N. This intermediate portion M has a surface refractive focal power which changes progressively allowing focused vision for objects located between 50 cm and to approximately 1 to 2 m. The convex surface has a central standard line (sometimes referred to as the principal meridional line) S which extends along a vertical axis, substantially along the center of the lens, bisecting the convex surface into two symmetrical halves (i.e. a right half and a left half). This standard line S is a curved line that has a curvature which increases from the distance portion F, at the top of the lens to the reading portion N at the bottom of the lens. Typically, no astigmatism results with lines of sight along line S. The curvature of the central standard line S progressively increases from point A, located at the peak of the intermediate portion M, to point B located at the lower segment of portion M. The point A is an optimal lens point for viewing distant objects (a distance point) and is located adjacent to the geometrical center of the lens. The point B is the optimal lens point for viewing nearby objects (reading point). The lens area above point A is defined as distance portion F, the area below point B is defined as the reading portion N and the area between the distance and reading portions is defined as the intermediate portion M.

FIG. 1B is a graph illustrating the relationship between refractive focal power and the distance of standard line S from the bottom portion of the lens 300. This relationship is highlighted by the linear portions 100, 102 and 104 that correspond to distance portion F, reading portion N and intermediate portion M. The linear portion 100 exhibits a constant refractive focal power D1, and the linear portion 102 exhibits a constant refractive focal power D2. The refractive focal power D2 of the linear portion 102 is greater than the refractive focal power D1 of the linear portion 100. The linear portion 104 exhibits progressive focal power which increases as the length of standard line S decreases. The difference between the refractive focal powers D2 and D1 is referred to as "additional focal power" which is usually 0.5 D (diopter) to 3.5 D.

Generally, it is known in the art that the surface refractive focal power SRP of the convex lens surface is expressed by the following equation:

$$SRP=(n-1)\times C \ [D]$$

wherein n is a refractive index of the lens material; and C represents a curvature ($m^{-1}$). Since the refractive index n is constant, the curvature is proportional to the surface refractive focal power. Accordingly, the graph of FIG. 1B shows a change in the curvature of the central standard line S. Consequently, the intermediate portion M corresponding to the linear portion 104 assumes an aspherical shape. The curvature in any direction (e.g., the horizontal and vertical directions) for any given point differ within the intermediate portion M. Referring to the curvature in any two directions at any given point in the intermediate portion M as the maximum curvature C1 and the minimum curvature C2 (generally known as principal curvatures) astigmatism AS can be expressed by the following equation:

$$AS=(n-1)\times|C1-C2|.$$

Thus, astigmatism occurs in an aspherical region of the lens.

FIG. 2 shows the distribution of surface areas on a lens 300 associated with astigmatic viewing. Contour lines 110, 112 and 114 demarcate portions of the lens having 0.50 D, 0.75 D and 1.00 D respectively. Generally, astigmatism of 0.5 D or more is produced when viewing occurs through from lines 110 to the periphery of the lens 300. As a consequence, the viewer sees a blurred image. Blurred viewing is especially noticeable in portions of the lens demarcated from line 114 outward toward the periphery of the lens. This blurred viewing often appears to shear the viewed image causing the viewer to feel uncomfortable. On the other hand, when viewing occurs between lines 110, astigmatism of 0.5 D or less is produced, and generally, no image blurring occurs. This region is hereinafter referred to as clear vision area. The clear vision area in the intermediate portion M is generally referred to as progressive lens portion. The entire clear vision area is generally known to be defined as the zone satisfying the following equation:

$$(n-1)\times|C1-C2|\leq 0.5 \ [D]$$

wherein n represents a refractive index of the lens material, and C1 and C2 represent two principal curvatures ($m^{-1}$) at an arbitrary point.

Unfortunately it is impossible to form a progressive power multifocal lens that does not produce same degree of astigmatism. More specifically, formation of spherical distance and reading lens portions necessarily result in the intermediate portion having an aspherical shape. Consequently, viewing through segments of the intermediate portion results in astigmatic viewing. Alternatively, when the distance and reading portions are formed partially aspherical in shape, the astigmatic surface of the entire lens increases, but the degree of astigmatism produced when viewing through the intermediate portion decreases. However, this type of lens design reduces the areas of the lens which allow for distant and close-up viewing. As described above, when a progressive power multifocal lens is designed, it is important to minimize the astigmatic surface of the lens.

As shown in FIG. 2, the clear vision area of a prior art progressive power multifocal lens has maximum widths W1 in the distance portion, W2 in the intermediate portion and W3 in the reading portion. Width W3 is narrower than width W1, and width W2 is narrower than width W3. This forces the clear vision area in the reading portion N to be small, and the visual field to be narrow. Moreover, in the intermediate portion M, the visual field is narrower still, so that the wearer feels as if he is peeping through a clearance. During viewing of any object, a lens wearer will not only use the clear vision area of the lens but also the peripheral areas as well often unconsciously. Such peripheral areas are generally known in the art and referred to as quasi-clear vision areas, which satisfy the following equation:

$$(n-1)\times|C1-C2|\leq 0.75 \ [D]$$

It is important to realize that quasi-clear vision areas of the lens include clear viewing surface areas. When producing progressive power multifocal lenses, it is most desirable to form lines 110, 112 and 114 as far from the standard line S toward the periphery of the lens as possible. This produces the maximum amount of clear vision surface area on the lens. With a wide quasi-clear vision area, incorporating both the clear and the quasi-clear vision areas peripheral vision markedly increases. In conventional lenses, the quasi and clear vision areas in the distance and reading portion F and N are relatively wide. Both areas are relatively narrow in the intermediate portion M. Such lens designs attach greater importance to distance and reading views and less importance to intermediate viewing. Further, this lens has an eyepoint (not shown) located adjacent to the distance point A. Distant objects are viewed through this eyepoint. However, the area where the eyepoint exists is close to the boundary of intermediate portion M and therefore is often found in a relatively astigmatic surface area of the lens. This reduces the amount of clear distance viewing.

SUMMARY OF THE INVENTION

Accordingly, it is a primary objective of the present invention to provide a progressive power presbyopia-correcting ophthalmic lens which provides clear vision viewing for intermediate and close-up distance viewing.

To achieve the foregoing and other objects and in accordance with the purpose of the present invention, an improved ophthalmic lens is provided, which includes a refractive surface partitioned into a first area, a second area located above the first area and a third area located below the first area. The surface has a vertically extending principal meridional line. The first area includes a reading point providing a first refractive focal power on said meridional line. The second area provides a surface refractive focal power less than that of the reading point. The third area provides a surface refractive focal power stronger than that of the reading point. The refractive focal power in the first area progressively changes between the second and third areas. The first area includes a quasi-clear vision area that has a maximum horizontal width in the proximity of a geometrical center of the lens and a clear vision area. The quasi-clear vision area satisfies the relationship $(n-1) \times |C1-C2| \leq 0.75$ and the clear vision area satisfies the relationship $(n-1) \times |C1-C2| \leq 0.50$. In the two equations, n represents the refractive index of the lens material, and C1 and C2 represent principal curvatures of cross curves at their point of intersection at any given point in the first area.

BRIEF DESCRIPTION OF THE DRAWINGS

The features of the present invention that are believed to be novel are set forth with particularity in the appended claims. The invention, together with the objects and advantages thereof, may best be understood by reference to the following description of the presently preferred embodiments taken in conjunction with the accompanying drawings in which:

FIG. 1A is a front view of a prior art progressive power multifocal lens having three viewing zones; and FIG. 1B is a graph illustrating the relationship between the focal power and standard line length of the lens shown in FIG. 1A; and FIG. 2 is a diagram showing distribution of astigmatic surfaces of a progressive power multifocal lens.

FIGS. 3A, 3B and 4 to 10 illustrate aspects of a presbyopia-correcting lens according to a first embodiment, in which:

FIG. 3A is a front view of a presbyopia-correcting lens; and

FIG. 3B is a graph illustrating the relationship between the focal power and standard line length of the lens shown in FIG. 3A;

FIG. 4 is a front view of a presbyopia-correcting lens having three viewing zones;

FIG. 5 is a diagram illustrating the distribution of particular dioptrics across the presbyopia-correcting lens;

FIG. 6 is a perspective view of the presbyopia-correcting lens in which a plurality of imaginary horizontal lines are protected on the convex surface;

FIG. 7A is a graph illustrating the relationship between the refractive focal power of the lens at points along the imaginary horizontal lines extending from the standard line over the convex surface of the lens; and FIG. 7B is a graph illustrating the relationship between the refractive focal power of the lens at points along vertical lines projected onto the lens;

FIG. 8 is a perspective view of a progressive power multifocal lens in which a plurality of imaginary horizontal and vertical lines of intersection are drawn on the convex surface;

FIG. 9 is a diagram showing an image of square grid seen through the presbyopia-correcting lens; and FIG. 10 is a front view of a pair of progressive power multifocal lenses according to the first embodiment incorporated into a frame.

FIGS. 11A, 11B, 12A and 12B illustrate aspects of a presbyopia-correcting lens according to a second embodiment, in which:

FIG. 11A is a front view of a presbyopia-correcting lens according to the second embodiment; and FIG. 11B is a graph illustrating the relationship between the focal power and standard line length of the lens shown in FIG. 11A. and FIG. 12A is a graph illustrating the relationship between the refractive focal power of the lens at points along the imaginary horizontal lines extending from the standard line over the convex surface of the lens; and FIG. 12B is a graph illustrating the relationship between the refractive focal power of the lens at points along vertical lines projected onto the lens.

FIGS. 13 to 17 each show a presbyopia-correcting lens according to a third embodiment, in which:

FIG. 13 is a front view of a presbyopia-correcting lens;

FIG. 14 is a perspective view of a progressive power multifocal lens in which a plurality of imaginary horizontal and vertical lines of intersection are drawn on the convex surface;

FIG. 15 is a graph illustrating the relationship between the refractive focal power of the lens at points along the imaginary horizontal lines extending from the standard line over the convex surface of the lens; and FIG. 16 is a graph illustrating the relationship between the refractive focal power of the lens at points along vertical lines projected onto the lens; and FIG. 17 is a schematic diagram illustrating the angle of vision produced when a pair of eyes moved in a horizontal direction.

DETAILED DESCRIPTION OF THE PREFERRED EMBODIMENTS

First Embodiment

Figure 3A:
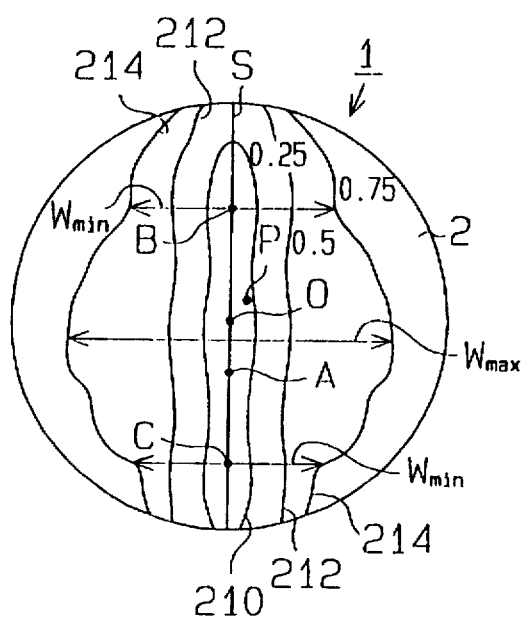

Presbyopia-correcting lens according to a first embodiment of the invention will now be described referring to the attached figures. As shown in FIG. 3A, a presbyopia-correcting lens 1 has a diameter of 50 mm and is provided with a convex surface 2 opposing a concave surface (not shown). The convex surface 2 has a central standard line S extending along a vertical axis bisecting the convex surface 2 into two symmetrical halves. In this embodiment, the standard line S intersects the geometrical center O of the lens 1. The present invention may be embodied to lens whose geometrical center O is not along its standard line S. Three important points are located on the standard line S. The first point, referred to as a reading point A, is located at the distance of 7 mm below the geometrical center O. This reading point A serves as an optimal viewing point on the lens for viewing close-up objects. A second point, referred to as a weak diopter point B, is located at the distance of 13 mm above the geometrical center O. Weak diopter point B serves as an optimal viewing point on the lens for viewing objects set at a distance greater than A. A third point, referred to as a strong diopter point C, is located at the distance of 17 mm below the geometrical center O. Strong diopter point C serves as an optimal viewing point on the lens for viewing objects set at a distance less than A.

Figure 4:
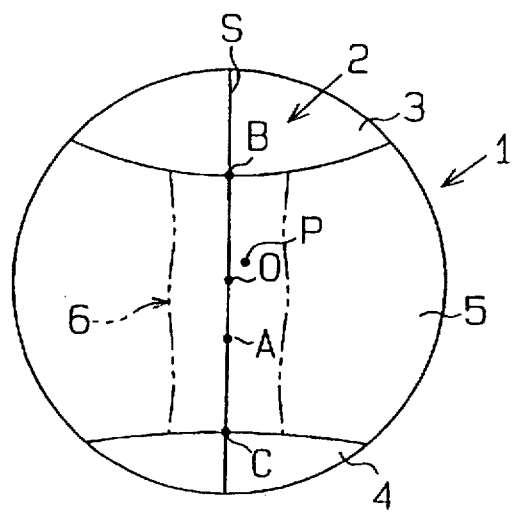

As shown in FIG. 4, the convex surface 2 is divided into three viewing areas. According to this embodiment, the first viewing area is referred to as a weak diopter or room viewing distance portion 3. This portion of the lens the weak diopter point B and is located at the top of the convex surface 2. The second viewing area is referred to as a strong diopter or close-up portion 4. This lens portion contains the strong diopter point C and is located at the bottom of the convex surface 2. The third viewing area is referred to as an intermediate or reading portion 5, located between the weak diopter portion 3 and the strong diopter portion 4.

The central standard line S has a curvature which increases from the weak diopter point B to the strong diopter point C and the value of standard lines exhibits essentially no astigmatic characteristics and cannot be identified visually. The lens at the reading point A provides a refractive focal power correcting presbyopia and allowing clear vision of objects located no further than 50 cm from the eye. In this embodiment, the refractive focal power of the lens at reading point A is approximately 2.50 D. The wearer can also clearly view objects located at the distance of 0.40 m (=1/2.50) from the eye through this reading point A.

The lens at weak diopter point B provides less refractive focal power than reading point A. Diopter portion 3 on the lens 1 has a refractive focal power substantially equal to that of the weak diopter point B. When the viewer views objects at arm length through either diopter point B or through portion 3, the objects will appear to be in focus. In this embodiment, the refractive focal power of the weak diopter point B is approximately 1.50 D. The lens wearer can view objects through the weak diopter point B and portion 3 at the distance of 0.67 m (=1/1.50).

The lens at strong diopter point C provides a refractive focal power stronger than that at reading point A. The strong diopter portion 4 has a refractive focal power substantially equal to that of the diopter point C. For very close-up viewing objects should be viewed through strong diopter point C and portion 4. According to this embodiment, the refractive focal power of the strong diopter point C is approximately 3.00 D. This allows a lens wearer having no power of accommodation to clearly view objects located approximately 0.33 m (=1/3.00) from the eye.

The refractive focal power used for the intermediate portion 5, increases progressively from the weak diopter point B to the strong diopter point C through point A. Conversely, the focal power progressively decrease from point A to point B in the upper area of intermediate portion 5. The upper area of the intermediate area 5 allow clear or focused viewing of objects located at the distances of from 40 cm to 67 cm.

The area below reading point A has a progressively increasing refractive focal power from reading point A to diopter point C. This lower area enables clear viewing of objects located at the distances of from 40 cm to 33 cm without the use of any power of accommodation. As described above, the lens 1 is well suited for near view operations including desk work, book reading, newspaper reading, medical operations including surgery and intricate mechanical operation. Moreover, when wearer's lines of sight cross either intermediate portion 5, strong diopter portion 4 or weak diopter portion 5, distant objects or nearby objects will appear clear and focused without the wearer exercising his power of accommodation. This reduces the incidence of asthenopia when the lenses 1 are worn for extended periods of time.

Figure 3B:
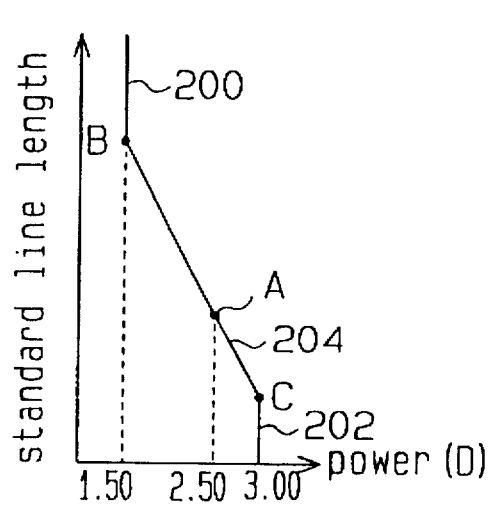

FIG. 3B is a graph illustrating the relationship between the focal power and standard line length of the lens 1 on the central standard line S. The significance of this relationship is the linear gradient across portions 200, 202 and 204 which define the progressive additional refractive focal power across weak diopter portion 2, the strong diopter portion 4 and the intermediate portion 5. The linear portion 200 represents the refractive focal power (1.50 D) of the weak diopter portion 2, linear portion 202 represents the refractive focal power (3.00 D) of the strong diopter portion 4 and linear portion 204 represents the additional refractive focal power of the intermediate portion 5 which increases progressively. The increase in additional focal power occurs from 1.50 D to 3.00 D (1.50 D) between weak diopter point B and the strong diopter point C. On the other hand, the total dioptric focal power i.e., the combined refractive power of convex surface 2 and the concave surface (not shown), over the intermediate portion 5 increases from 1.50 D to 3.25 D.

As shown in FIG. 4, the intermediate portion 5 contains a vertical band 6 centered on central standard line S. This band, hereinafter referred to as progressive portion 6, is a clear vision area with an astigmatic value of 0.50 D or less. The refractive focal power of the progressive portion 6 increases progressively, and the gradient can be expressed by the difference (1.50 D) between the refractive focal power of the weak diopter point B and the strong diopter point C. In this embodiment, the gradient is 0.05 D/mm (=1.50 D/30 mm). The slope angle of the gradient described for this embodiment is characteristically less than that found in conventional progressive power multifocal lenses.

Figure 5:
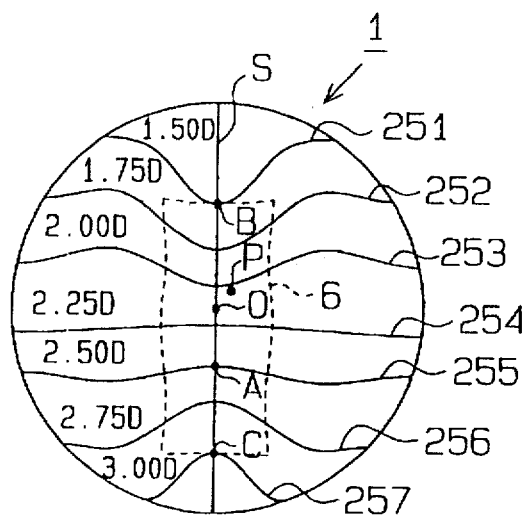

FIG. 5 is a diagram showing dioptric distribution of total dioptric focal power of the lens 1. This distribution is expressed by dioptric contour lines 251 to 257 and has 7 total refractive focal powers ranging from 1.50 to 3.00 D at specific 0.25 D increment. The dioptric contour lines 251, 254 and 257 overlap with the weak diopter point B, the reading point A and the strong diopter point C, respectively. The dioptric contour lines 251 to 253 each form an upward convex curve that extends to the left and right from the point of intersection with the central standard line S. The peaks of the convex curves are located about 15 mm from the standard line S. This means that the total dioptric focal power of the lens first increases as it extends toward the periphery of the lens and then decreases as it further extends toward the periphery. The dioptric contour lines 255 to 257 each form a downward convex curve and extend left and right from the point of intersection with the central standard line S. The peaks of these contour curves are located about 15 mm on each side from the standard line S. For lines 255 to 257, the total dioptric focal power initially decreases as the lines extend toward the periphery of the lens and then increases as it further extends from the periphery. Further, in the progressive portion 6 (shown by the broken line in FIG. 5), the curve of each of the dioptric contour lines 252, 253 and 255 have a relatively small slope angle. As a result total dioptric focal power in the progressive portion 6 is horizontally uniform and provides a clear vision area for focused viewing of objects located 33 cm to 67 cm from the eye.

When the lens 1 is worn by a lens wearer the right side of the lens is located near the ear and the left side is located by the nose. Lens 1 has a fitting point P located at a distance of 2 mm above the geometrical center O and 2 mm from the standard line S toward the right side of the lens. Accordingly, the reading point A is located at a distance of 9 mm below fitting point P and 2 mm from the fitting point toward the left side of the lens. The fitting point P defines that point on the lens where the lines of sight pass when a lens wearer attempts to view objects at a distance. The fitting point P may be located on a horizontal line including the geometrical center O. As described above, locating the fitting point P to the right side permits placement of the reading point A to the left of point P when the lens 1 is incorporated into a frame. This enables the lines of sight to pass proximate to the reading point A and to converge on an object. Locating the reading point A at a distance of 9 mm below the fitting point P allows the lines of sight to pass proximate to the reading point A, even when a wearer bends forwards to turn down his eyes. This permits the wearer to clearly view a nearby object.

Next, the clear vision area and the quasi-clear vision area in this lens 1 will be described. The clear and quasi-clear vision areas respectively satisfy, the following equations:

$$(n-1) \times |C1-C2| \leq 0.50 \ |D| \quad (1)$$

and $$(n-1) \times |C1-C2| \leq 0.75 \ |D| \quad (2)$$

where n represents a refractive index of the lens material; and C1 and C2 are principal curvatures ($m^{-1}$) (i.e., intersecting curved lines) at any point on the convex surface of the lens. The clear vision area is defined as that area where astigmatic value of the lens surface is 0.5 D or less. The quasi-clear vision area is defined as that area where the astigmatic value of the lens surface is 0.75 D or less. Although image distortion in the quasi-clear vision area is controlled, image distortion in the clear vision area is less than that in the quasi-clear vision area.

Figure 9:
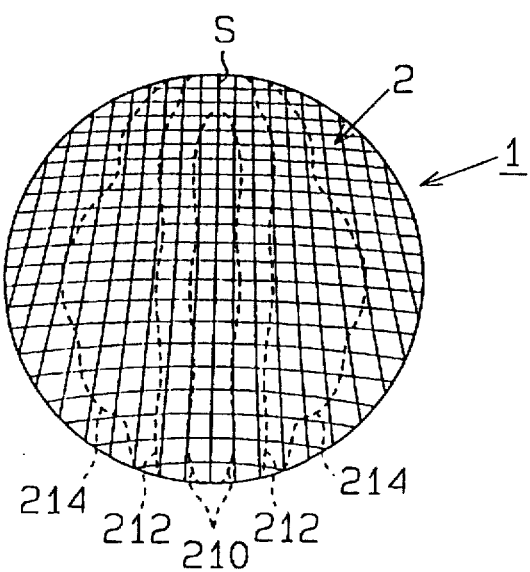

FIG. 3A shows the distribution of astigmatic values on the convex surface 2, in the range of 0.25 D, 0.50 D and 0.75 D as indicated by astigmatic contour lines 210, 212 and 214, respectively. The area surrounded by the contour line 212 is the clear vision area, and the area surrounded by the contour line 214 is the quasi-clear vision area. The progressive portion 6 shown in FIG. 4 is included in the clear vision area and has a horizontal width of about 12 mm. In particular, the progressive portion 6 has a maximum width of 12 mm at 2 mm below the geometrical center O and a minimum width of 11 mm at diopter points B and C. The maximum width is 1.1 times as wide as the minimum width. The quasi-clear vision area in the intermediate portion 5 has a maximum horizontal width $W_{max}$ of 40 mm at 2 mm below the geometrical center O, and a minimum width $W_{min}$ of 20 mm at diopter points B and C. The maximum horizontal width $W_{max}$ is 2.0 times as wide as the minimum width $W_{min}$. FIG. 9 illustrates the patterns of distortion apparent to the viewer when the lens 1 is placed over a square patterned grid. The area within the contour line 212, when viewed through the lens 1, exhibits an astigmatic value of 0.50 D or less so that each section of the grid appears substantially square. This means that the progressive portion 6 can minimize image distortion and reeling that occurs with conventional lenses when the wearer moves his eyes.

Figure 6:
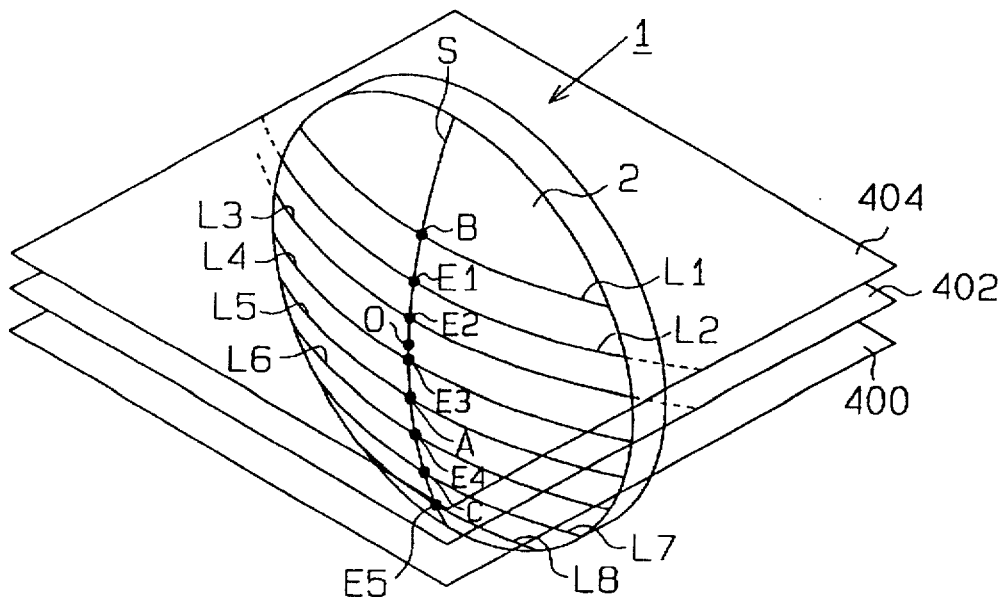

Next, referring to FIG. 6, the distribution of refractive power over the convex surface 2 will be described. For the purpose of this explanation, the following assumptions will be made: one, a horizontal plane 400 passes through the geometrical center O of the lens and is perpendicular to the central standard line S; two, that there are eight horizontal planes (only two planes 402, 404 are shown) which are arranged in the vertical direction parallel to the plane 400 and; three, that these planes have eight lines of intersection L1 to L8 which intersect with the convex surface 2, as shown in FIG. 6. In this embodiment, the lines of intersection are expressed, like the refractive focal powers, by the following formula:

$$(n-1)/R \ |D|$$

wherein n represents a refractive index of the lens material and R represents the radius of curvature for each line. The line L4 is 2 mm below geometrical center O and intersects the central standard line S at point E3. Line L3 is 5 mm above line L4 and intersects standard line S at point E2. Line L5 is 5 mm below line L4 and intersects standard line S at reading point A. Line L2 is 10 mm above line L4 and intersects standard line S at point E1. Line L6 is 10 mm below line L4 and intersects standard line S at point E4. Line L1 is 15 mm above line L4 and intersects standard line S at weak diopter point B. Line L7 is 15 mm below line L4 and intersects standard line S at strong diopter point C. Line L8 is 20 mm below line L4 and intersects standard line S at point E5.

FIG. 7A is a graph illustrating the relationship between the refractive focal power of the lens at points along the imaginary horizontal lines L1 to L8. Since this relationship is symmetrical, only the right portion of the lens refractive power distribution is shown. The refractive power along lines L1 to L4 progressively increase from point B to points E1, E2 and E3. The refractive power also increases in the horizontal direction along lines L1 to L4 up to approximately 15 mm to the right and left of the standard line S. Beyond 15 mm from standard line S, the refractive power along lines L1 to L4 begins to decrease.

The horizontal refractive power along lines L5 to L8 progressively decreases from points A, E4, C and E5. The refractive power also decreases in the horizontal direction along lines L5–L8 up to approximately 15 mm to the right and left of standard line S. Beyond 15 mm from the standard line S, the refractive power along lines L5–L8 progressively increases. As described above, the lines L1 to L8 are of non-circular curved lines which exhibit progressive refractive power in the horizontal direction. The change in refractive power along the horizontal minimizes the noticeable difference in refractive power between upper and lower portion of the lens. This allows the lens wearer to perceive a continuously clear focused and non-reeling image of objects within one meter from the eye.

The decrease in the refractive power in the horizontal direction along lines L1–L4 enhances the lens wearer's direction vision. Specifically when an object creates a right angle with the line of sight, the line of sight is proximate to the standard center line S. As the line of sight moves to the right or left of line S, the viewer's line of sight increases, in length, assuming that the same object is used and not moved. The advantage of the lens according to the present embodiment is that, in the lower portion the refractive power initially decreases as the line of sight moves right or left of line S allowing clear and focused viewing despite the change in the length of the line of sight.

Further, the rate with which the refractive focal power increases in the horizontal direction along lines L1, L2 and L3 is substantially the same as the rate with which the refractive focal power decreases in the horizontal direction along lines L5, L6 and L7. This means that the refractive focal power in the horizontal direction along the convex surface 2 exhibits symmetry in the upper and lower areas of the lens. In particular the refractive focal power along line L7 is the mirror image of the power along line L1. The same relationship exists for lines L6, L2 and L5 and L3. Therefore symmetry exists around line L4. This reduces the astigmatism produced through the central portion of the lens and distributes the astigmatic producing services to the upper, lower, right, and left portion of the lens. The advantage of doing this is that these portion are not frequently used. This also allows for an increase in the portion 6 and allows the width to be constant down its entire length. In addition, the change in the refractive focal power in the horizontal direction of line L1 can be minimized. This minimalization allows line L4 to have a constant curvature with respect to point E3, a substantially constant magnification in the horizontal direction along the line L4 as well as a low degree of astigmatism. Consequently, as shown in FIGS. 3A and 4, the width of the progressive portion 6 and the quasi-clear vision area in the proximity of the geometrical center O can be maximized. This further increases viewing clarity and width in the portion 6 around geometrical center O and fitting point O and P. Consequently the present embodiment increases the amount of peripheral vision available to the lens wearer.

Figure 8:
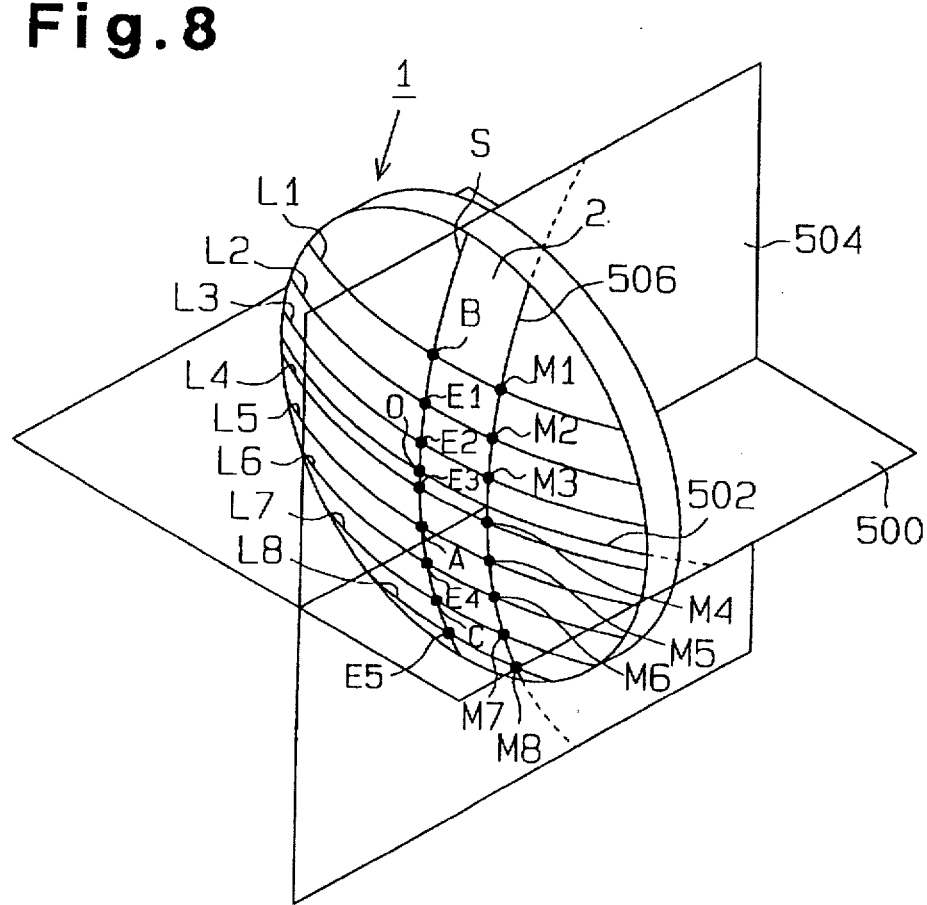

To explain the progression of power in the vertical direction reference will be made to FIG. 8 along with the following assumptions: one, suppose that there is a horizontal plane 500 which passes through geometrical center O and is perpendicular to the central standard line S; two, that the line of intersection formed by the plane 500 and the intermediate portion 5 is the horizontal standard line 502; and three, that there is a vertical cross sectional plane 504 which is perpendicular to the horizontal standard line 502. The plane 504 has a line of intersection 506 with the convex surface 2. The line 506 intersects points M1 to M8 which respectively lie on lines L1 to L8, as shown, like in FIG. 6. To illustrate the variation of changes in progression of power in the vertical direction, when the line of sight moves in the horizontal direction, plane 504 is illustrated a first being located on the standard line S and moved to the right. Points M1 to M8 are illustrated as moving horizontally with the movement of plane 504. As shown in FIG. 7B, the refractive focal power in the vertical direction is substantially constant along line 506 through points M1 to M8 as plane 504 moves to the right. According to the invention in this embodiment the change in the progression of refractive focal power is less in the vertical direction than it is in the horizontal direction. This reduces the vertical prism error effect in the lens and the reeling effect often felt by the lens wearer with horizontal head movement.

Figure 10:
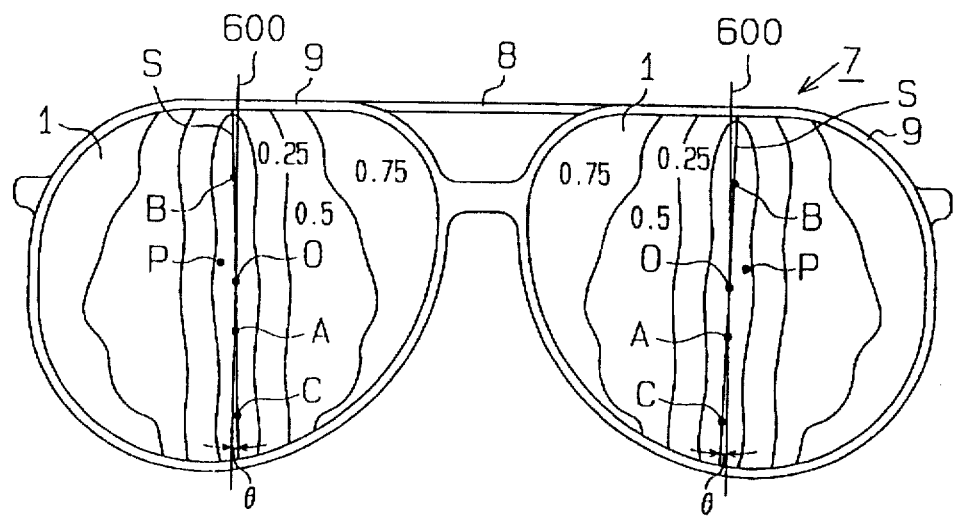

FIG. 10 shows a front view of eye-glasses incorporating the presbyopia-correcting lenses 1 according to the first embodiment into a frame. The eye-glasses 7 use a frame 8, rims 9 designed for the left and the right eye respectively and a pair of presbyopia-correcting lenses 1 machined after the shapes of the rims 9 and fitted in the rims 9. The lenses 1 are fitted in the frame 8 in such a way that the fitting points P accurately match the wearer's eyepoints. The eyepoints are points on the axis of eye lens at which the brightest and sharpest visual image is obtained. Further, each lens 1 is rotated to the right side by a predetermined angle θ (2° in FIG. 10) around the geometrical center O with respect to the vertical standard line 600 passing the geometrical center O. This allows the lines of sight to converge after passing proximate to strong diopter point C, for close-up object viewing. That is, the strong diopter point C is shifted by 2.5 mm from the fitting point P toward the left side. Thus, the eye-glasses 7 provides the wearer with a wide clear viewing area through the intermediate portions 5. Further, the eye-glasses 7 minimize image reeling which often occurs when the wearer moves his eyes in the vertical direction between the weak diopter point B and the strong diopter point C.

Second Embodiment

Next, a second embodiment of the invention will be described. Incidentally, the similar constituents to those in the first embodiment are affixed with the same reference numbers, respectively.

Figure 11A:
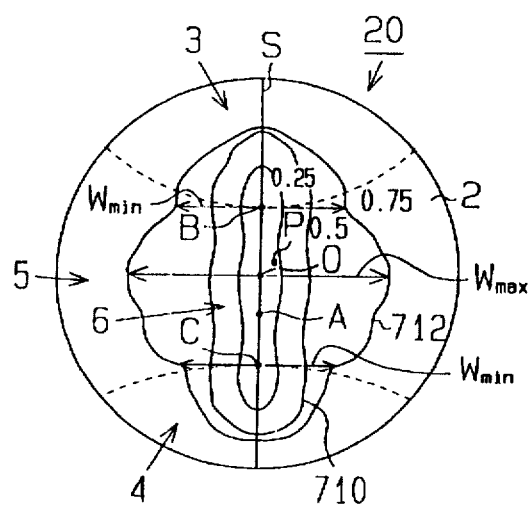

As shown in FIG. 11A, the weak diopter point B is located on the central standard line S at the distance of 7 mm above the geometrical center O. The strong diopter point C is located on the standard line S at the distance of 11 mm below the geometrical center O. The reading point A is located on the central standard line S 7 mm below the geometrical center O as in the first embodiment.

The weak diopter point B has a refractive focal power (in this case 1.72 D) weaker than the focal power at the reading point A (2.50 D). The weak diopter portion 3 has a refractive focal power substantially equal to that of the weak diopter point B. Accordingly, a wearer can view objects located at a distance of 0.58 m (=1/1.72 D) through the weak diopter point B and the weak diopter portion 3. The strong diopter point C has a refractive focal power (in this case 2.72 D) stronger than that at reading point A. The strong diopter portion 4 has a refractive focal power substantially equal to that at strong diopter point C. Accordingly the wearer can view objects locating at the distance of 0.37 m (=1/2.72 D) proximate to strong diopter point C and portion 4.

Figure 11B:
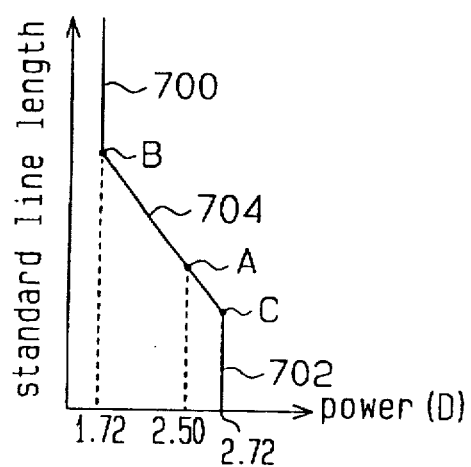

FIG. 11B is a graph illustrating the relationship between the refractive focal power of the lens on the central standard line S of the lens 20 according to the second embodiment. The linear portion 700 represents the refractive focal power (1.72 D) of the associated weak diopter portion 3, and the linear portion 702 represents the refractive focal power (2.72 D) of the associated strong diopter portion 4. The linear portion 704 represents the progressive refractive focal power in the intermediate portion 5 as can be seen the power increases progressively from the weak diopter point B to the strong diopter point C. The progressive refractive focal power is equal to the difference (1.00 D) between the refractive focal power of the weak diopter point B and that of the strong diopter point C. The difference in the refractive focal powers is referred to as intra-lens variation. Accordingly, the wearer can view objects locating at the distance of 58 cm to 37 cm through the intermediate portion 5 and more particularly, progressive portion 6 without exercising his power of accommodation.

The area within portion 6 exhibits an astigmatic value of 0.50 D or less, is included in the clear vision area and is surrounded by a contour line 710, as shown in FIG. 11A. In this embodiment the portion 6 has a length of 18 mm. The difference between the refractive focal power at the weak diopter point B and that at the strong diopter point C is 1.00 D. Accordingly, the gradient in the refractive focal power in the progressive portion 6 is 0.06 D/mm (≈1.00 D/18 mm). This gradient is substantially equal to that in the first embodiment. This makes it possible to obtain a lens, as in the first embodiment, which exhibits reduced image reeling and distortion. The progressive portion 6 has a horizontal width of about 10 mm. In particular, the portion 6 has a maximum width of 11 mm at 2 mm below the geometrical center O and a minimum width of 10 mm at points B and C. The maximum width is 1.1 times as wide as the minimum width.

The intermediate portion 5 includes not only the clear vision area (progressive portion 6) but also the quasi-clear vision area that produces an astigmatic value of 0.75 D or less. The quasi-clear vision area is defined by that area surrounded by a contour line 712, as shown in FIG. 11A. The quasi-clear vision area has a maximum horizontal width $W_{max}$ of 34 mm located 2 mm above the reading point A and a minimum horizontal width $W_{min}$ of 17 mm at weak diopters point B and C. The maximum width $W_{max}$ is 2.0 times as wide as the minimum width $W_{min}$.

Figure 12A:
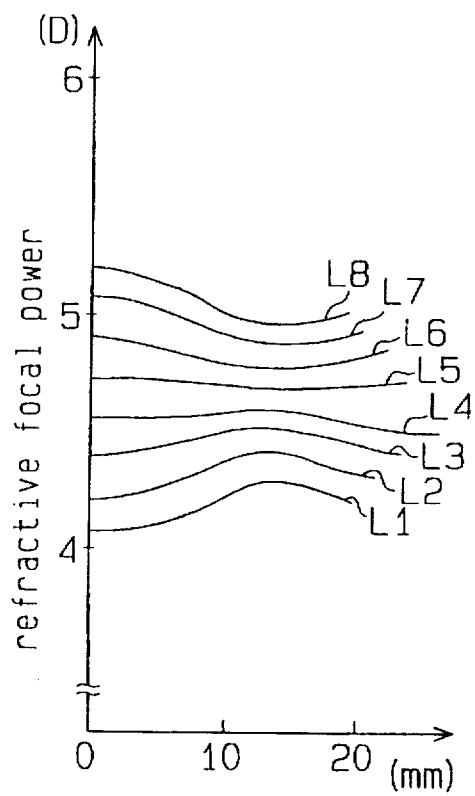

FIG. 12A is a graph showing the distribution of refractive focal power of the convex surface 2 of lens 20. Here the horizontal refractive focal powers are indicated by imaginary lines L1 to L8 similar to those in the first embodiment. The lines L1 to L8 are noncircular curved lines having a progressive refractive focal power in the horizontal direction similar to that of the first embodiment. The difference in the second from the first embodiment is that the refractive focal powers of intersecting points A, E4, E5 and strong diopter point C on central standard line S are slightly less than those of the first embodiment. Further, the refractive focal powers of the weak diopter point B and the intersecting points E1 and E2 on central standard line S are slightly greater than those in the first embodiment.

Figure 12B:
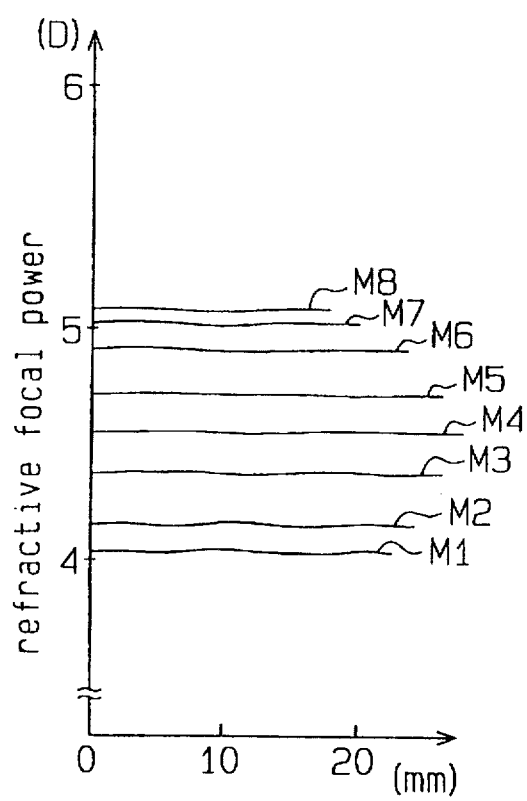

FIG. 12B is a graph showing the distribution of refractive focal powers over imaginary line 506 that includes points M1 to M8 that lie on lines L1 to L8. The refractive focal power of line 506 is substantially constant in the direction away from the standard line S. Further, although not shown, the lens 20 has a similar total dioptric focal power distribution along lines 251 to 257 as explained in the first embodiment.

Third Embodiment

Next, a third embodiment of the invention will be described. Incidentally, the similar constituents to those in the first embodiment are affixed with the same reference numbers, respectively.

Figure 13:
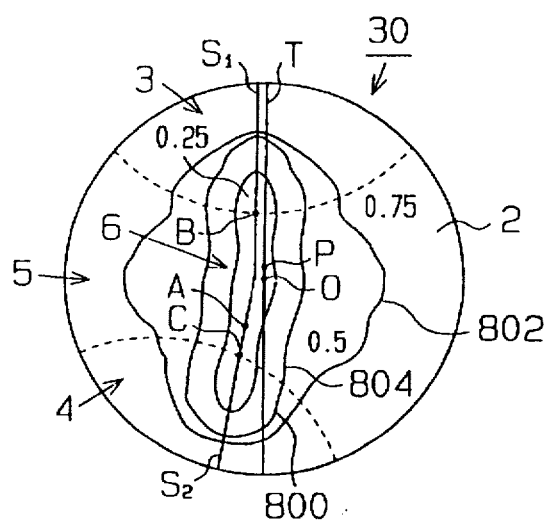

As shown in FIG. 13, the lens 30 has a diameter of 70 mm and also a meridional line T passing the geometrical center O and extends in the vertical direction. The central standard line has a first segment S1 and a second segment S2 along the meridional line T. The first segment S1 extends from the level of the geometrical center O to the top of the lens 30; whereas the second segment S2 extends from the level of the geometrical center O to the bottom of the lens 30. Further, the first segment S1 is parallel to the meridional line T and is displaced by about 1.0 to 2.0 mm to the left side. The second segment S2 is displaced greatly from the meridional line T toward the left side as it directs toward the bottom of the lens 30. Accordingly, the strong diopter point C on the second segment S2 is displaced to the left side. Consequently, when the lens 30 is to be incorporated into a frame, the lens 1 need not be turned taking convergence into consideration as in the first embodiment.

The reading point A is located on the segment S2 spaced 9 mm below the geometrical center O, and located about 2.5 mm to 3 mm to the left side from the geometrical center O. The weak diopter point B is located on the segment S1 spaced 7 mm above the geometrical center O. The strong diopter point C is located on the segment S2 spaced 11 mm below the geometrical center O. The fitting point P is located on the meridional line T spaced 2 mm above the geometrical center O. Refractive focal powers of the reading point A, weak diopter point B and strong diopter point C are 2.50 D, 1.72 D and 2.72 D, respectively, like in the second embodiment. As shown in FIG. 13, the progressive portion 6 according to this embodiment is included in the clear vision area surrounded by an astigmatic contour line 800 providing an astigmatic value of 0.50 D or less. The progressive portion 6 has a length of 18 mm and the difference between the refractive focal power of the weak diopter point B and that of the strong diopter point C is 1.00 D. Accordingly, the gradient of the refractive focal power in the progressive portion 6 is 0.06 ($\approx$1.00 D/18 mm) like in the second embodiment.

Figure 17:
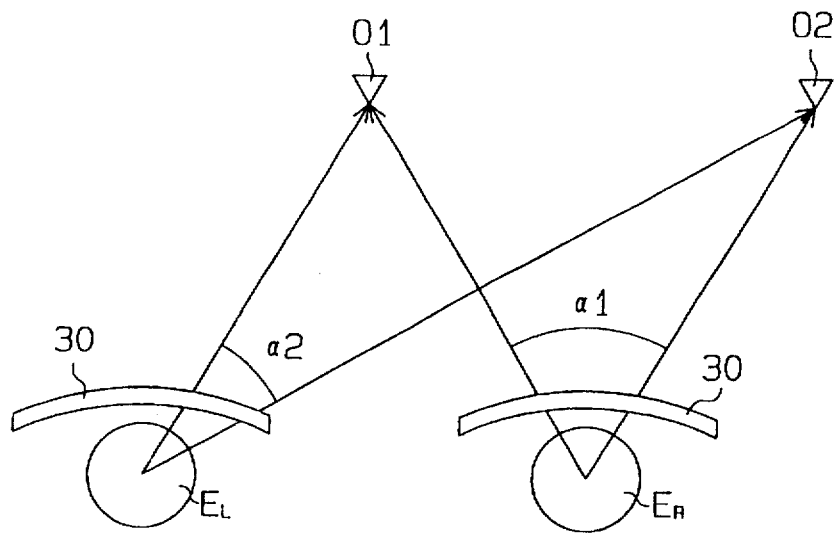

As shown in FIG. 13, distribution of astigmatism on the convex surface 2 is indicated by the astigmatic contour lines 800, 802 and 804 associated with 0.25 D, 0.50 D and 0.75 D, respectively. The contour lines 800, 802 and 804 are asymmetric, respectively, with respect to the segments S1 and S2. Strictly speaking, contour lines 800, 802 and 804 are asymmetric up to 15 mm from the segments S1 and S2 toward the left side and right side of the lens, respectively. Then, the spaces between the lines 800, 802 and 804 are widened more on the right side than on the left side. This means that the astigmatic distribution is sparser on the right side than on the left side. The thus designed lens 30 is effective in the following cases. When a wearer moves his eyes to the right, as shown in FIG. 17, from a nearby object O1 to another object O2 locating sideways, shift $\alpha 1$ of the right eye ER to the right side of the lens is greater than the shift $\alpha 2$ of the left eye EL to the left side. Such shift $\alpha 1$ is a causative of image reeling. However, if the astigmatic distribution is sparse on the right side of the convex surface 2, the wearer recognizes less image reeling in spite of a great shift $\alpha 1$ of the right eye ER. Shifts of the eyes of the wearer when he views distant objects using the upper half of the lens 30 are smaller than those when he views nearby objects using the lower half of the lens 30. Accordingly, the astigmatic distribution in the upper half of the lens 30 may not be asymmetric with respect to the right side and the left side. Further, the lines 800, 802 and 804 may be asymmetric up to 20 mm from the segments S1 and S2 to the left side and right side, respectively.

Figure 14:
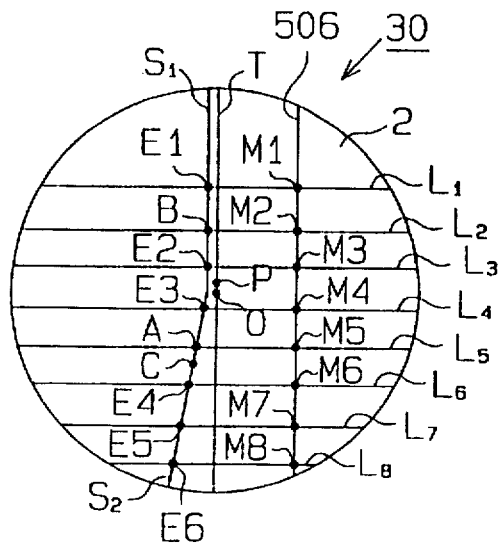
Figure 15:
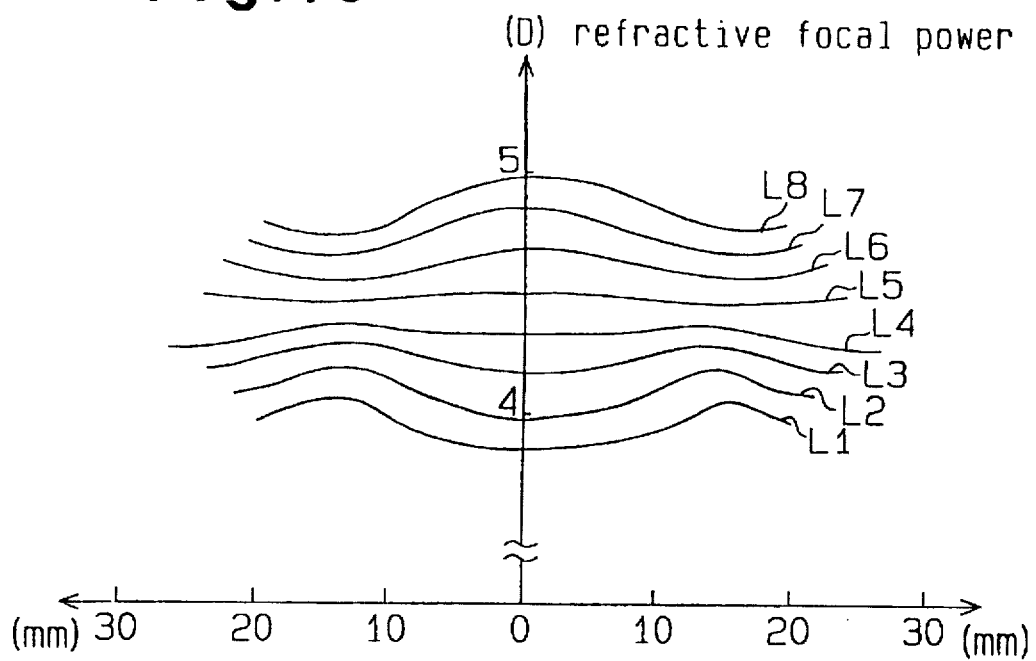

FIG. 14 shows imaginary lines of intersection L1 to 8 and the line 506 intersecting with them, which are drawn on the convex surface 2 of the lens 30. FIG. 15 is a graph showing horizontal refractive focal powers of the lines L1 to L8. The lines L1 to L3 contain an intersecting point E1, the weak diopter point B and an intersecting point E2 overlapping with the segment S1, respectively. Further, the lines L4 to L8 contain an intersecting point 3, the reading point A, the strong diopter point C and intersecting points E4 and E5 overlapping with the segment S2, respectively. Refractive focal powers of the lines L1 to L4 increase, up to about 14 mm to the left side and about 16 mm to the right side from the segments S1,S2, from the refractive focal powers at the intersecting point E1, weak diopter point B, intersecting point E2 and E3, respectively. At the positions spaced about 14 mm or more to the left side and about 16 mm or more to the right side, the thus increased refractive focal powers start to decrease. Refractive focal powers of the lines L5 to L8 decrease, up to about 12 mm to the left side and about 18 mm to the right side from the segment S2, from the refractive focal powers at the reading point A, strong diopter point C, intersecting points E4 and 5, respectively. At the positions spaced about 12 mm or more to the left side and about 18 mm or more to the right side, the thus decreased refractive focal powers start to increase. Thus, the lines L1 to L8 are noncircular curves in which the horizontal refractive focal powers change in the horizontal direction.

Figure 16:
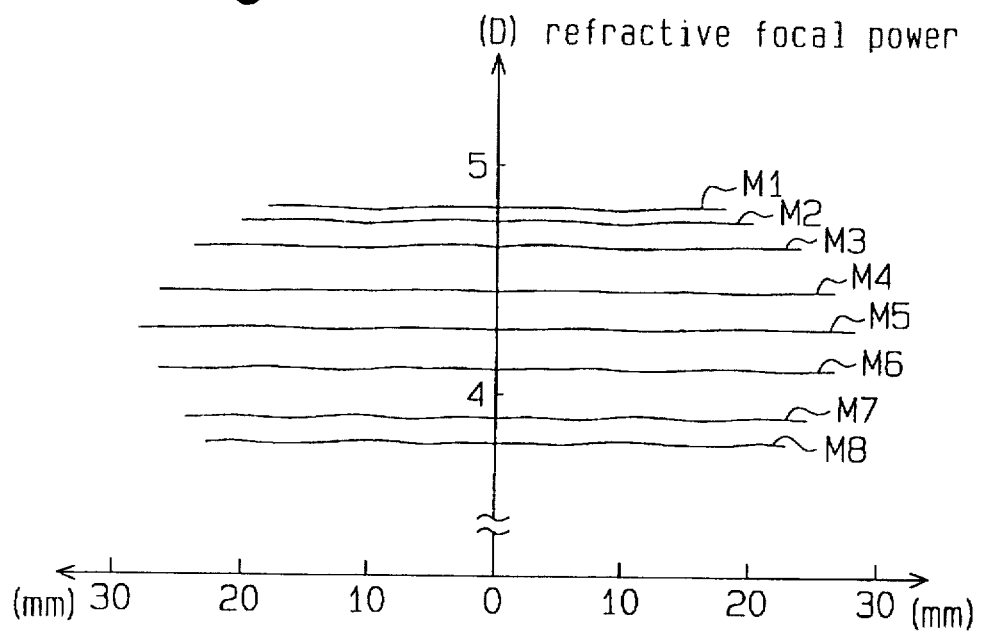

FIG. 16 is a graph showing a refractive focal power (vertical refractive focal power) of the line 506 shown in FIG. 14. The refractive focal power of the line 506 is substantially constant from the segments S1,S2 toward the left side and right side, respectively.

As has been detailed above, the presbyopia-correcting lenses according to the present invention are not only best suited for those who have almost lost their powers of accommodation and when they carry out near view operations but also are useful for those who use both progressive power multifocal lenses having distance portions and reading portions and monofocal lenses; and those who brings their eyes closer to a nearby object when they view it using monofocal lenses.

Although only three embodiments of the present invention have been described herein, it should be apparent to those skilled in the art that the present invention may be embodied in many other specific forms without departing from the spirit or scope of the invention. Particularly it should be understood that the present invention may be embodied in the following manners.

Numerical values with respect to the following items (1) to (8) may be changed as follows.

(1) Progressive focal power in progressive portion 6 is the difference between the refractive focal power of the weak diopter point B and that of the strong diopter point C and can be set to any of the following ranges: 0.50 D to 4.00 D, 1.00 D to 2.00 D and 1.25 D to 1.75 D. For surface areas of the lens having small progressive focal power levels, the astigmatism produced by the convex surface 2 is such that provides for increased clear and quasi-clear vision width and reduced distortion. Moreover such levels tend to decrease the reeling effects felt by lens wearers.

In another example where the difference between a refractive focal power at points B and C is 4.0 D (i.e., 6.50 D–2.5 D), a wearer with no power of accommodation can view objects locating at the distance of 2 m to 22 cm from his eye. In the case where the progressive focal power is less than 0.50 D, the distance over which the wearer can clearly view objects decreased. Where the progressive focal power is greater than 4.00 D, the difference between the refractive powers in the weak and strong diopter portions 3 and 4 do not allow comfortable close-up.

(2) The gradient in the change of progressive focal power may be set to 0.10 (D/mm) or lower. If this value is small, a presbyopia-correcting lens will have a small astigmatic effect and reduced distortion, and will inhibit the reeling effect caused by head or eye movement.

(3) Length of progressive portion 6 may be changed to 20 mm or more. In this case, the progressive refractive focal power is preferably within the range of 1.00 D to 2.00 D or 1.25 D to 1.75 D in order to reduce its gradient. For example, when the progressive portion 6 has a length of 25 mm and a progressive refractive focal power within the range of 1.25 D to 1.75 D, the gradient of the progressive refractive focal power will be 0.05 to 0.07 (D/mm). Further, the length of the progressive portion 6 may be arbitrarily changed within the range of not less than 14 mm and less than 25 mm. In this case, the progressive refractive focal power is preferably within the range of 0.50 D to 1.50 D or 0.75 D to 1.25 D in order to reduce its gradient. For example, when the progressive portion 6 has a length of 16 mm and a progressive refractive focal power within the range of 0.75 D to 1.25 D, the gradient of the progressive refractive focal power will be 0.05 to 0.08 (D/mm).

(4) Maximum width $W_{max}$ of quasi-clear vision area may be changed to 1.5 to 3 times as wide as the minimum width of the quasi-clear vision area. However, a maximum width of at least 12 mm should be secured in the intermediate portion 5. If the maximum width is narrower than 12 mm, the width of the progressive portion 6 becomes too narrow. Further, the maximum width may be greater by 10 mm or more than the minimum width. The ratio of the maximum width to the minimum width may be 1.3 or less over the ranges of +10 mm from the reading point A in the vertical direction.

(5) Position of maximum width $W_{max}$ in quasi-clear vision area may be located within the range of 10 mm or 5 mm above or below the geometrical center O. The reason is because, if the maximum width $W_{max}$ is not within the range of 10 mm above or below the geometrical center O, the quasi-clear vision area is excluded from the intermediate portion 6 which is of frequent use, and wide clear vision cannot be provided in this portion 6.

(6) Position of fitting point P may be displaced 2.5 to 3 mm from the reading point A to the right side of the lens. Such displacement allows the strong diopter point C to locate at a position shifted to the left side and meet convergence, when the lens 1 is incorporated into a frame with no rotation. The fitting point P may be located in the range from 0 mm to 2 mm above the geometrical center O. Particularly, the fitting point P may be located within 15 mm (more preferably within 10 mm) above the reading point A.

Figure 18A:
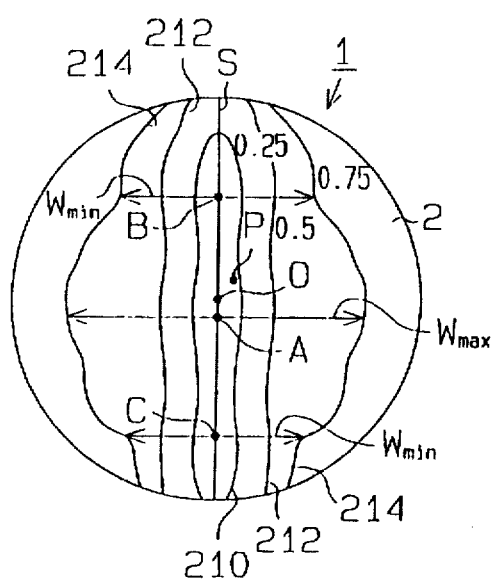
FIG. 18A is a front view of a presbyopia-correcting lens according to another embodiment.
Figure 18B:
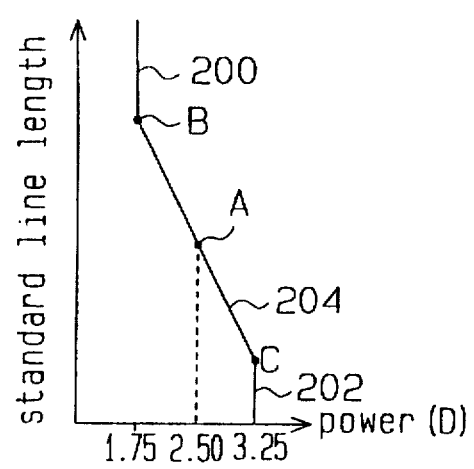
FIG. 18B is a graph illustrating the relationship between the focal power and standard line length of the lens shown in FIG. 18A.

(7) Position of reading point A may be located between 2 mm and 12 mm below the geometrical center O. For example, as shown in FIG. 18A, the reading point A may be located 2 mm below the geometrical center O. FIG. 18B is a graph illustrating the relationship between the focal power and standard line length of the lens shown in FIG. 18A. If the distance geometrical the reading point A and the geometrical center O exceeds 12 mm, a wearer has to turn his eyes at a very large angle when he views a nearby object.

(8) Positions of weak diopter point B and strong diopter point C may be arbitrarily changed.

Therefore, the present examples and embodiments are to be considered as illustrative and not restrictive, and the invention is not to be limited to the details given herein, but may be modified within the scope of the appended claims.

What is claimed is:

1. An ophthalmic lens comprising:

a refractive surface partitioned into a first area, a second area located above said first area and a third area located below said first area, said refractive surface having a vertically extending principal meridional line;

said first area including a reading point providing a first refractive focal power on said meridional line, said second area providing a surface refractive focal power less than that of said reading point, and said third area providing a surface refractive focal power greater than that of said reading point;

wherein the refractive focal power in said first area progressively changes between the second and third areas as an additional refractive focal power;

wherein said first area includes a quasi-clear vision area that has an absolute maximum horizontal width in an area defined between horizontal lines located 10 mm above and below a geometrical center of said lens, and a clear vision area having a substantially uniform width in a vertical direction in said first area; and wherein said quasi-clear vision area satisfies the relationship $(n-1) \times |C1-C2| \leq 0.75$ D and said clear vision area satisfies the relationship $(n-1) \times |C1-C2| \leq 0.50$ D, where n represents the refractive index of the lens material, and where C1 and C2 represent principal curvatures of cross curves at their point of intersection at any given point in said first area; and wherein said clear vision area has a horizontal width of at least 10 mm throughout the area defined by horizontal lines located 10 mm above and 10 mm below the geometrical center of the lens.

2. The ophthalmic lens according to claim 1, wherein said second area contains a weak diopter point located on said principal meridional line, said weak diopter point providing a refractive focal power smaller than that of said reading point; said third area contains a strong diopter point located on said principal meridional line, said strong diopter point providing a refractive focal power greater than that of said reading point; wherein the refractive focal power along said principal meridional line progressively changes between the weak diopter point and the strong diopter point.

3. The ophthalmic lens according to claim 1, wherein the additional refractive focal power in said first area is within the range of 0.50 D to 4.00 D.

4. The ophthalmic lens according to claim 1, wherein said refractive surface further includes a fitting point located between 4 mm and 15 mm from said reading point.

5. The ophthalmic lens according to claim 1, wherein said clear vision area has a predetermined width and extends vertically.

6. The ophthalmic lens according to claim 1, wherein said clear vision area has a maximum horizontal width in an area defined between horizontal lines located 10 mm above and below the geometrical center of said lens.

7. The ophthalmic lens according to claim 1, wherein said first area has a vertical length of 14 mm or more and less than 25 mm along said principal meridional line and also has an additional refractive focal power in the range of 0.50 D to 1.50 D.

8. The ophthalmic lens according to claim 1, wherein the refractive surface further includes a fitting point located within 7 mm to 9 mm from said reading point.

9. The ophthalmic lens according to claim 1, wherein said clear vision area has an absolute maximum horizontal width of about 12 mm at about 2 mm below the geometrical center of the lens.

10. The ophthalmic lens according to claim 1, wherein said quasi-clear vision area has a first local minimum horizontal width and a second local minimum horizontal width located on opposite sides of the absolute maximum horizontal width.

11. An ophthalmic lens comprising:
a refractive surface partitioned into a first area, a second area located above said first area and a third area located below said first area, said refractive surface having a vertically extending principal meridional line;
said first area including a reading point providing a first refractive focal power on said meridional line, said second area providing a surface refractive focal power less than that of said reading point, said third area providing a surface refractive focal power greater than that of said reading point, and wherein the refractive focal power in said first area progressively changes between the second and third areas as an additional refractive focal power;
wherein said first area includes a quasi-clear vision area that has an absolute maximum horizontal width in an area defined between horizontal lines located 10 mm above and below a geometrical center of said lens; and a clear vision area having a substantially uniform width in a vertical direction in said first area;
a plurality of imaginary curved lines perpendicular to and intersecting said meridional line, one of said curved lines being a principal curved line located proximate to the geometrical center of said lens, said principal curved line dividing said lens into upper and lower lens halves, the upper half of which includes the second area and a first portion of said first area, the lower half of which includes the third area and a second portion of said first area;
wherein the curvature of said lens surface at points along said imaginary curved lines in said upper lens half increases from said meridional line towards the periphery of said lens, and wherein the curvature of said lens at points along said imaginary curved lines in said lower lens half decreases from said meridional line toward the periphery of said lens; and
wherein the increase in the curvature of said lens surface in the upper lens half is substantially symmetrical with the decrease in the curvature of said lens surface in the lower lens half.

12. The ophthalmic lens according to claim 11, wherein said reading point is located in the range of 2 mm to 12 mm below the geometrical center of the lens.

13. The ophthalmic lens according to claim 11, wherein said second area contains a weak diopter point located on said principal meridional line, said weak diopter point providing a refractive focal power smaller than that of said reading point; said third area contains a strong diopter point located on said principal meridional line, said strong diopter point providing a refractive focal power greater than that of said reading point; wherein the refractive focal power along said principal meridional line progressively changes between the weak diopter point and the strong diopter point.

14. The ophthalmic lens according to claim 11, wherein the additional refractive focal power in said first area is within the range of 0.50 D to 4.00 D.

15. The ophthalmic lens according to claim 11, wherein said refractive surface further includes a fitting point located between 4 mm and 15 mm from the reading point of the lens.

16. The ophthalmic lens according to claim 11, wherein said first area has a vertical length of 20 mm or more along said principal meridional line and also has an additional refractive focal power in the range of 1.00 D to 2.00 D.

17. The ophthalmic lens according to claim 11, wherein said first area has a vertical length of 14 mm or more and less than 25 mm along said principal meridional line and also has an additional refractive focal power in the range of 0.50 D to 1.50 D.

18. The ophthalmic lens according to claim 11, wherein the refractive surface further includes a fitting point located within 7 mm to 9 mm from said reading point.

19. The ophthalmic lens according to claim 11, wherein said clear vision area has a horizontal width of at least 10 mm throughout the area defined by horizontal lines located 10 mm above and 10 mm below the geometrical center of the lens.

20. The ophthalmic lens according to claim 11, wherein said clear vision area has an absolute maximum horizontal width of about 12 mm at about 2 mm below the geometrical center of the lens.

21. The ophthalmic lens according to claim 11, wherein said quasi-clear vision area has a first local minimum horizontal width and a second local minimum horizontal width located on opposite sides of the absolute maximum horizontal width.

22. An ophthalmic lens comprising:
a refractive surface having an upper and lower area with curvature thereon, said refractive surface partitioned into a first area, a second area located above said first area and a third area located below said first area, said refractive surface having a vertically extending principal meridional line;

said first area including a reading point providing a first refractive focal power on said meridional line, said second area providing a surface refractive focal power less than that of said reading point, and said third area providing a surface refractive focal power greater than that of said reading point;

wherein the refractive focal power in said first area progressively changes between the second and third areas as an additional refractive focal power;

wherein said first area includes a quasi-clear vision area that has a maximum horizontal width in an area defined between horizontal lines located 10 mm above and below geometrical center of said lens and a clear vision area having a substantially uniform width in a vertical direction in said first area;

wherein said quasi-clear vision area satisfies the relationship $(n-1) \times |C1-C2| \leq 0.75$ D and said clear vision area satisfies the relationship $(n-1) \times |C1-C2| \leq 0.50$ D, where n represents the refractive index of the lens material, and where C1 and C2 represent principal curvatures of cross curves at their point of intersection at any given point in said first area; and wherein said curvature in the horizontal direction along said refractive surface exhibits substantial symmetry in said upper and lower areas.

23. The ophthalmic lens according to claim 22, wherein said clear vision area has a horizontal width of at least 10 mm throughout the area defined by horizontal lines located 10 mm above and 10 mm below the geometrical center of the lens.

24. The ophthalmic lens according to claim 22, wherein said clear vision area has an absolute maximum horizontal width of about 12 mm at about 2 mm below the geometrical center of the lens.

25. The ophthalmic lens according to claim 22, wherein said quasi-clear vision area has a first local minimum horizontal width and a second local minimum horizontal width located on opposite sides of the absolute maximum horizontal width.

* * * * *